US011203260B2

(12) United States Patent
Metzdorf

(10) Patent No.: US 11,203,260 B2
(45) Date of Patent: Dec. 21, 2021

(54) CLUTCH DEVICE AND DRIVETRAIN COMPRISING SUCH A CLUTCH DEVICE

(71) Applicant: BorgWarner Inc., Auburn Hills, MI (US)

(72) Inventor: Frederik Johann Metzdorf, Ludwigshafen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/958,979

(22) PCT Filed: Jan. 23, 2019

(86) PCT No.: PCT/US2019/014687
§ 371 (c)(1),
(2) Date: Jun. 29, 2020

(87) PCT Pub. No.: WO2019/147624
PCT Pub. Date: Aug. 1, 2019

(65) Prior Publication Data
US 2020/0346537 A1  Nov. 5, 2020

(30) Foreign Application Priority Data
Jan. 24, 2018  (DE) .......................... 102018000565.9

(51) Int. Cl.
*F16D 25/12* (2006.01)
*B60K 6/387* (2007.10)
*F16D 25/0638* (2006.01)

(52) U.S. Cl.
CPC .......... *B60K 6/387* (2013.01); *F16D 25/0638* (2013.01); *F16D 25/12* (2013.01); *B60Y 2200/92* (2013.01); *B60Y 2400/42* (2013.01)

(58) Field of Classification Search
CPC .. B60K 6/387; B60K 6/40; B60K 2006/4825; B60K 6/48; F16D 25/0638; F16D 25/12; B60Y 2200/92; B60Y 2400/42
See application file for complete search history.

(56) References Cited

U.S. PATENT DOCUMENTS 4,549,443 A  10/1985  White
5,577,588 A  11/1996  Raszkowski
(Continued)

FOREIGN PATENT DOCUMENTS

DE  3521932 A1  1/1987
DE  102004041180 A1  4/2005

OTHER PUBLICATIONS

International Search Report of the International Searching Authority for PCT/US2019/014687 dated May 8, 2019.
(Continued)

*Primary Examiner* — David J Hlavka
(74) *Attorney, Agent, or Firm* — Howard & Howard Attorneys PLLC

(57) ABSTRACT

A clutch device includes a clutch input hub which is connectable to a drive unit (24), a clutch output hub which is connectable to an electric machine and/or to a transmission, a clutch via which the clutch input hub can be selectively brought into rotary driving connection with the clutch output hub, and an actuating piston for hydraulically actuating the clutch, a chamber to which fluid may be applied being assigned to said actuating piston, wherein fluid can be applied to the chamber via a first rotary feedthrough between a stationary component and the clutch input hub and via a second rotary feedthrough between the clutch input hub and the clutch output hub. The first rotary feedthrough and the second rotary feedthrough are designed on the side of clutch
(Continued)

input hub facing outward in radial direction. A drivetrain having the clutch device is also included.

18 Claims, 1 Drawing Sheet

(56) References Cited

U.S. PATENT DOCUMENTS

| | | |
|---|---|---|
| 7,181,989 B2 | 2/2007 | Obinata |
| 2003/0148843 A1 | 8/2003 | Bowen |
| 2007/0213163 A1* | 9/2007 | Combes .................. B60K 6/26 475/100 |
| 2007/0256907 A1 | 11/2007 | Gremplini et al. |
| 2008/0087517 A1 | 4/2008 | Mori et al. |
| 2009/0008212 A1* | 1/2009 | Combes .................. B60K 6/48 192/113.34 |
| 2012/0118695 A1 | 5/2012 | Kawashima et al. |
| 2012/0175212 A1 | 7/2012 | Hart et al. |
| 2013/0035202 A1* | 2/2013 | Ideshio .................. B60K 6/48 477/5 |
| 2013/0088105 A1* | 4/2013 | Frait ...................... F16H 61/62 310/71 |
| 2016/0084363 A1* | 3/2016 | Steinberger ............. B60K 6/38 192/3.28 |

OTHER PUBLICATIONS

English language abstract for DE 35 21 932 extracted from espacenet.com database on Aug. 6, 2020, 2 pages.
English language abstract for DE 10 2004 041 180 extracted from espacenet.com database on Aug. 6, 2020, 2 pages.

* cited by examiner

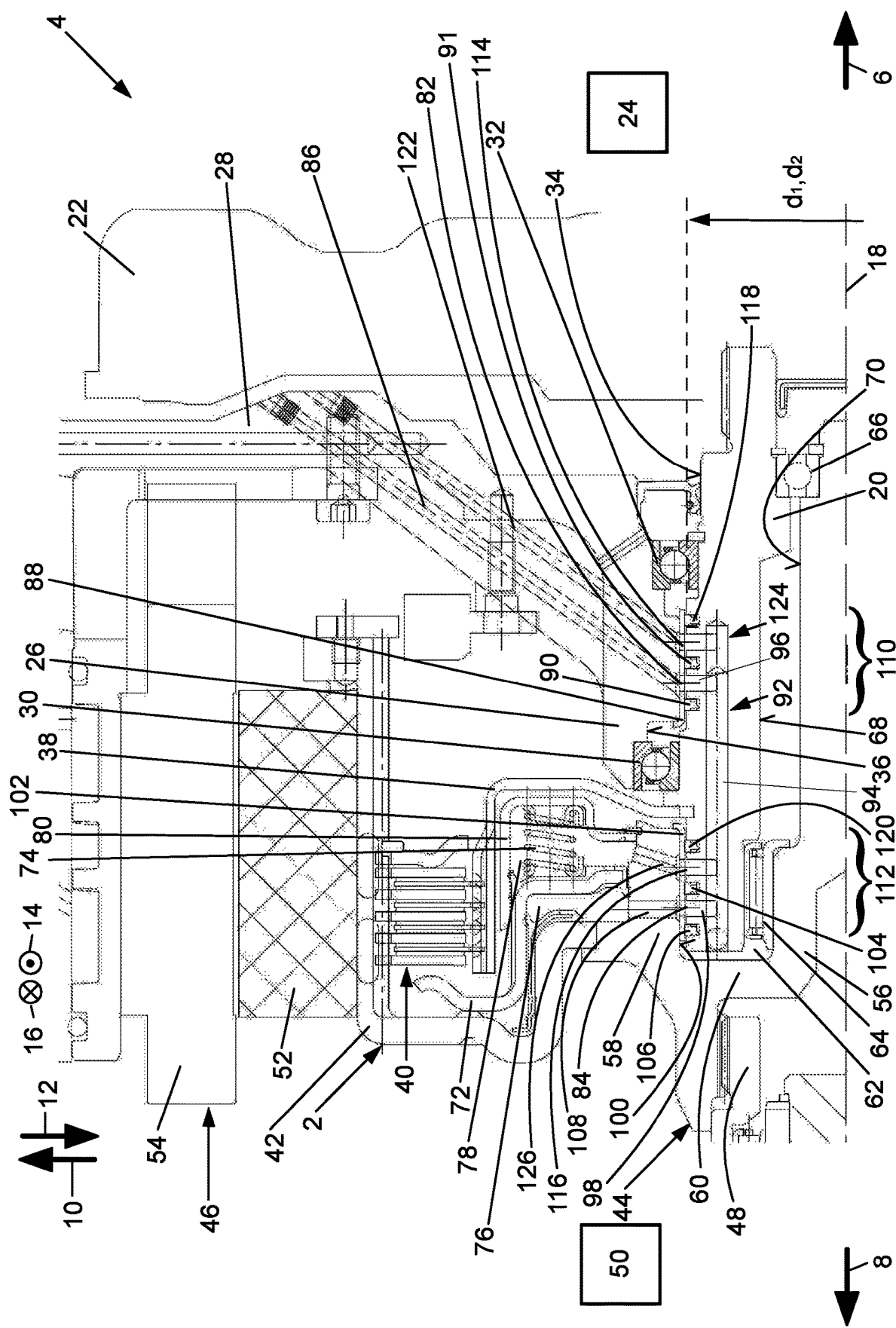

CLUTCH DEVICE AND DRIVETRAIN COMPRISING SUCH A CLUTCH DEVICE

CROSS-REFERENCE TO RELATED APPLICATIONS

The present application is the National Stage of International Patent Application No. PCT/US2019/014687 filed on Jan. 23, 2019, which claims priority to and all the benefits of German Patent Application No. 102018000565.9 filed Jan. 24, 2018, which are hereby expressly incorporated by reference in their entirety.

DESCRIPTION

The present invention relates to a clutch device comprising a clutch input hub, a clutch output hub, a clutch via which the clutch input hub may be selectively brought into rotary driving connection with the clutch output hub, and an actuating piston for hydraulic actuation of the clutch, a chamber to which fluid may be applied being assigned to said actuating piston, wherein fluid, thus, for example, hydraulic fluid or compensation fluid, may be applied to the chamber via a first rotary feedthrough between a stationary component and the clutch input hub and via a second rotary feedthrough between the clutch input hub and the clutch output hub.

Clutch devices for drivetrains in a hybrid vehicle are known from practice. The clutch devices each have a clutch input hub, which is connected to a drive unit, for example, an internal combustion engine, a clutch output hub, which is connected to an electric machine and a transmission, a clutch, via which the clutch input hub may be selectively brought into rotary driving connection with the clutch output hub, and an actuating piston for hydraulic actuation of the clutch. A first chamber, to which hydraulic fluid may be applied, is assigned to the actuating piston on one side, and a second chamber, to which a compensation fluid may be applied, is assigned to the other side in order to effect a so-called centrifugal oil compensation. The corresponding fluid may be applied to the two chambers respectively via a first rotary feedthrough between a stationary component, for example, a support tube, and the clutch input hub and via a second rotary feedthrough between the clutch input hub and the clutch output hub. The clutch input hub, rotatably supported inward in the radial direction on the clutch output hub, is arranged relative to the stationary component in such a way that the first rotary feedthrough is designed on the side of the clutch input hub facing outward in the radial direction and on the side of the stationary component facing inward in the radial direction. In contrast, the second rotary feedthrough is designed on the side of the clutch input hub facing inward in the radial direction and on the side of the clutch output hub facing outward in the radial direction.

However, the known clutch device has proven, with respect to the fluid supply to the two chambers assigned to the actuating piston, that, during different operating modes of the clutch device and the drivetrain, relatively high differences occur with respect to the centrifugal oil compensation achieved. If the clutch of the clutch device is closed, for example, so that the clutch input hub is in rotary driving connection with the clutch output hub and the latter is driven via the drive unit, thus, for example, the internal combustion engine, then a comparatively large clutch balance is achieved, which is expressed in a relatively large "drift on" speed. The latter designates the rotational speed at which the actuating piston is moved or actuated solely due to the pressure exerted by the fluid column in the pressure chamber. In contrast, if the clutch device is open, so that the clutch input hub is decoupled from the clutch output hub and is no longer driven by the drive unit, while the drive of the clutch input hub is carried out via the electric machine, then this leads to a relatively low clutch balance and to a relatively low "drift on" speed. As a result, the designer is limited in the design of the clutch device, particularly as only one centrifugal oil compensation approximating the ideal centrifugal oil compensation may be achieved for each of the two described operating modes in order to achieve a good clutch balance.

It is therefore the object of the present invention to refine a clutch device of the generic type in such a way that its design is simplified with respect to different operating modes within the drivetrain of a hybrid vehicle. The additional underlying object of the present invention is to provide a drivetrain for a hybrid vehicle with a corresponding advantageous clutch device.

This problem is solved by the features of the clutch device as described herein.

The clutch device according to the invention is conceived of for use within a drivetrain of a hybrid vehicle and has a clutch input hub which may be connected to a drive unit, preferably to an internal combustion engine. The clutch input hub may thereby be connectable to the drive unit, both directly and also indirectly, in order to transfer the torque of the drive unit to the clutch input hub. In addition, the clutch device has a clutch output hub which may be connected directly or indirectly to an electric machine and/or a transmission, preferably to a vehicle transmission. Furthermore, the clutch device has a clutch, which is preferably designed as a disk clutch, optionally as a wet-running disk clutch. The clutch input hub may be selectively brought into rotary driving connection with the clutch output hub via the clutch, optionally via its disk set. An actuating piston is provided, which is preferably displaceable in the axial direction, for hydraulic actuation of the clutch. The actuating piston is preferably biased into an initial position via a reset device, wherein the clutch is particularly preferably open in the initial position so that it may also be considered to be a normally open clutch. A chamber, to which a fluid may be applied, is assigned to the actuating piston. The chamber may be, for example, a pressure chamber for driving the actuating piston, to which chamber a hydraulic fluid may be applied. However, the chamber may just as likely be a pressure compensation chamber, to which a compensation fluid may be applied for the purpose of achieving centrifugal oil compensation. In one preferred embodiment, which will be described again later in greater detail, both a pressure chamber and also a pressure compensation chamber are assigned to the actuating piston. A first rotary feedthrough and a second rotary feedthrough are provided in order to be able to apply fluid to the chamber, thus, for example, hydraulic fluid or compensation fluid. The first rotary feedthrough is designed between a stationary component, for example a housing section, and the clutch input hub, while the second rotary feedthrough is designed between the clutch input hub and the clutch output hub. Both the first rotary feedthrough and also the second rotary feedthrough are thereby designed on the side of the clutch input hub facing outward in the radial direction. By this means, the designer is enabled to arrange the two rotary feedthroughs on substantially the same plane in the radial direction at low structural cost, and thus to achieve a largely constant clutch balance and "drift on" speeds approximating one another independent of the respective operating mode of the clutch device.

In one preferred embodiment of the clutch device according to the invention, the first rotary feedthrough is arranged in a region of the clutch input hub with s first outer diameter and the second rotary feedthrough is arranged in a region of the clutch input hub with a second outer diameter, wherein the first outer diameter substantially corresponds to the second outer diameter in order to reinforce the advantages already previously mentioned. The first outer diameter should hereby preferably deviate at most by 10% from the second outer diameter, particularly preferably by at most 5%. In the ideal case, the first and second outer diameters correspond to one another.

In one advantageous embodiment of the clutch device according to the invention, a radial bearing, preferably a roller bearing, for example a needle bearing, is provided to support the clutch input hub in the radial direction on the clutch output hub.

In one particularly preferred embodiment of the clutch device according to the invention, the previously mentioned radial bearing is arranged nested in the radial direction with the first rotary feedthrough or with the second rotary feedthrough, preferably nested with the second rotary feedthrough. By this means, not only is a particularly compact structure achieved, but also a particularly high leak tightness is guaranteed in the region of the second rotary feedthrough.

In another preferred embodiment of the clutch device according to the invention, the second rotary feedthrough is designed on a side of the clutch output hub facing inward in the radial direction. Thus, it has proven advantageous if the clutch input hub extends into the clutch output hub in the axial direction. For this purpose, an annular space, open in one of the axial directions, is particularly preferably provided in the clutch output hub, and the clutch input hub extends into said annular space. For this purpose, the clutch input hub or at least the end section of the clutch input hub extending into the annular space of the clutch output hub is designed, for example, as tubular.

In order to achieve a particularly compact structure of the clutch device in the region of the clutch input hub and the clutch output hub, the second rotary feedthrough and/or the previously mentioned radial bearing is arranged within the annular space in the clutch output hub in another preferred embodiment of the clutch device according to the invention, wherein it is preferred if both the second rotary feedthrough and also the radial bearing are arranged within the annular space. It is hereby additionally advantageous if the radial bearing is arranged nested with the second rotary feedthrough in the radial direction, as this has already been previously mentioned.

According to another advantageous embodiment of the clutch device according to the invention, at least one connection line is designed in the clutch input hub for achieving a flow connection between the first and second rotary feedthroughs. The connection line preferably has a longitudinal section extending in the axial direction. It is hereby preferred if the longitudinal section extending in the axial direction extends exclusively in the axial direction, thus, for example, completely parallel to the axial directions and/or to the axis of rotation of the clutch device. It is also preferred if the maximum extension of the longitudinal section outward in the radial direction is constant over the entire longitudinal section.

According to another advantageous embodiment of the clutch device according to the invention, the longitudinal section of the connection line is in flow connection with the first rotary feedthrough via a first radial section of the connection line extending in the radial direction and with the second rotary feedthrough via a second radial section of the connection line extending in the radial direction. The two radial sections of the connection line thereby extend exclusively in the radial direction, thus are not inclined in the axial direction with respect to the radial direction.

According to another preferred embodiment of the clutch device according to the invention, the longitudinal section of the connection line within the clutch input hub is arranged offset inwardly in the radial direction with respect to the first rotary feedthrough and also with respect to the second rotary feedthrough. In addition, it is preferred in the present embodiment if the longitudinal section of the connection line is arranged offset outwardly in the radial direction with respect to the axis of rotation of the clutch device, even if a longitudinal section of the connection line arranged coaxial to the axis of rotation would be possible.

In order to simplify the assembly and production, in another advantageous embodiment of the clutch device according to the invention, the first rotary feedthrough is delimited in the axial direction by at least one first rotary feedthrough seal and the second rotary feedthrough is delimited in the axial direction by at least one second rotary feedthrough seal, wherein the first and second rotary feedthrough seal may be designed as structurally identical or as identical parts. Structurally identical rotary feedthrough seals are hereby to be understood as those rotary feedthrough seals that have the same structure, however, may be differently dimensioned, while rotary feedthrough seals designed as identical parts are identical with respect to structure and dimensioning.

In order to further simplify the structure of the clutch device and also its assembly and manufacturing, a first rotary feedthrough sleeve facing the first rotary feedthrough is arranged rotatably fixed on the stationary component or on the clutch input hub and a second rotary feedthrough sleeve facing the second rotary feedthrough is arranged rotatably fixed on the clutch output hub or on the clutch input hub, wherein the first and second rotary feedthrough sleeves are designed as structurally identical or as identical components.

According to another advantageous embodiment of the clutch device according to the invention, the clutch input hub is supported or mounted on the stationary component in the radial direction via at least one radial bearing, preferably a roller bearing. The stationary component is preferably a tubular component, optionally a support tube, into which or through which the clutch input hub extends. The support tube may thereby be designed, for example, as part of a housing, for example, a housing of the drive unit, or fixed on the same. In this embodiment, it is additionally preferred if at least two radial bearings are provided for supporting the clutch input hub on the stationary component, wherein the first rotary feedthrough is arranged preferably between the two radial bearings in the axial direction in order to ensure a high leak-tightness in the region of the first rotary feedthrough, wherein this also preferably applies for the third rotary feedthrough described later in greater detail.

As already previously indicated, the chamber in one preferred embodiment of the clutch device according to the invention is a pressure chamber to which a hydraulic fluid is applied, or is a pressure compensation chamber to which a compensation fluid is applied. Regardless of whether the chamber is designed as a pressure chamber or a pressure compensation chamber, it is preferred in this embodiment if a second chamber, designed as a pressure compensation chamber or pressure chamber, is additionally assigned to the actuating piston and to which second chamber fluid is applied via a third rotary feedthrough between the stationary component and the clutch input hub, and via a fourth rotary feedthrough between the clutch input hub and the clutch output hub. The third and fourth rotary feedthrough are also particularly preferably designed on the side of the clutch input hub facing outward in the radial direction. Alternatively or supplementally, the third and/or fourth rotary feedthrough has a common rotary feedthrough seal with the respectively adjacent first or second rotary feedthrough in order to achieve a particularly compact structure. In general, it is preferred in this embodiment if at least one additional, previously described, preferred feature relating to the first and/or second rotary feedthrough also applies to the third and/or fourth rotary feedthrough. In this respect, reference is made to the previously described preferred embodiments, which preferably correspondingly apply for the third and/or fourth rotary feedthrough.

The drivetrain according to the invention for a hybrid vehicle has a clutch device of the type according to the invention, wherein the clutch input hub is in rotary driving connection with a drive unit, preferably an internal combustion engine, and the clutch output hub is in rotary driving connection with a transmission and an electric machine. With regard to the advantages of such a drivetrain for a hybrid vehicle, reference is made to the advantages previously described with respect to the clutch device according to the invention, which advantages correspondingly apply for the drivetrain.

The invention is subsequently described in greater detail by way of an exemplary embodiment and with reference to the appended drawing. The single FIGURE shows a partial side view of a clutch device within a drivetrain for a hybrid vehicle in a sectional representation.

The single FIGURE shows a clutch device 2 within a drivetrain 4 for a hybrid vehicle, wherein the opposite axial directions 6, 8, the opposite radial directions 10, 12, and the opposite circumferential directions 14, 16 of drivetrain 4 or clutch device 2 are indicated by way of corresponding arrows, wherein circumferential directions 14, 16 may also be designated as rotational directions and clutch device 2 or components of the same are rotatable in circumferential direction 14, 16 about an axis of rotation 18 extending in axial directions 6, 8.

Clutch device 2 has a clutch input hub 20, designed as substantially tubular, which is rotatable about axis of rotation 18. Within drivetrain 4, clutch input hub 20 with its end facing in radial direction 6 is indirectly, in this case by means of a torsional vibration damper 22, in rotary driving connection with the output side of a drive unit 24, indicated merely schematically, wherein drive unit 24 is designed as an internal combustion engine. Clutch input hub 20 extends in axial direction 6, 8 through a stationary component 26, which is designed here as a support tube, wherein stationary component 26 is fixed on a stationary housing or is designed as one piece with said housing 28. Housing 28 may be, for example, the housing of drive unit 24 or the housing of clutch device 2. Clutch input hub 20 is supported outwardly in radial direction 10 on stationary component 26 in the form of the support tube via at least one radial bearing 30; 32. Thus, in the depicted embodiment, two radial bearings 30, 32 are provided, which are spaced apart from one another in axial direction 6, 8 and are arranged in radial direction 10, 12 between outer side 34 of clutch input hub 20 facing outward in radial direction 10 and inner side 36 of stationary component 26 in the form of the support tube facing inward in radial direction 12.

A first disk carrier 38 of a clutch 40 of clutch device 2 designed as a disk clutch is fixed rotatably fixed on the section of clutch input hub 20 projecting in axial direction 8 in the form of the support tube out of stationary component 26. In addition, clutch device 2 has a second disk carrier 42, which is designed here as an outer disk carrier and is connected rotatably fixed to a clutch output hub 44. Clutch output hub 44 is itself rotatable about axis of rotation 18. Clutch output hub 44 is thereby in indirect rotary driving connection on the one side with an electric machine 46 via second disk carrier 42 and on the other side with an input side 48 of a transmission 50, which is only schematically indicated. Stated more precisely, a rotor 52 of electric machine 46 is fixed rotatably fixed on second disk carrier 42, wherein a stator 54 of electric machine 46 is assigned to rotor 52.

Clutch output hub 44 has an inner hub section 56, which extends in axial direction 6 into tubular clutch input hub 20, and an outer hub section 58, said sections being connected to one another on their side facing in axial direction 8 via a connection section 60 while outer hub section 58 is spaced apart from inner hub section 56 so that an annular space 62, which is open in axial direction 6, is formed in radial direction 10, 12 between inner hub section 56 and outer hub section 58. Clutch output hub 44 and clutch input hub 20 are thereby designed or arranged in such a way that the substantially tubular end of clutch input hub 20 facing in axial direction 8 extends in axial direction 8 into annular space 62.

In addition, clutch input hub 20 is rotatably mounted or supported in radial direction 12 on inner hub section 56 of clutch output hub 44 by means of two radial bearings 64, 66, wherein the two radial bearings 64, 66 are spaced apart from one another in axial direction 6, 8 and are respectively formed by a roller bearing. Stated more precisely, the two radial bearings 64, 66 are arranged in radial direction 10, 12 between inner side 68 of clutch input hub 20 facing inward in radial direction and outer side 70 of clutch output hub 44 facing outward in radial direction 10 or inner hub section 56 of clutch output hub 44. While radial bearing 66 is arranged on the end section facing in axial direction 6 between clutch input hub 20 and clutch output hub 44, radial bearing 64 is arranged on the end section of clutch input hub 20 facing in axial direction 8 between clutch input hub 20 and clutch output hub 44. Radial bearing 64 is thereby arranged at least partially, in this case completely, within previously mentioned annular space 62 in clutch output hub 44.

Clutch input hub 20 may be selectively brought into rotary driving connection with clutch output hub 44 via clutch 40. Thus, in the case of an open clutch 40, as is shown in the FIGURE, clutch output hub 44 may be driven exclusively via electric machine 46. If, in contrast, clutch 40 is closed, then clutch input hub 20 is in rotary driving connection with clutch output hub 44 via clutch 40 so that clutch output hub 44 may be driven exclusively by the drive unit or by electric machine 46 and drive unit 24. Clutch 40 shown here is a normally open clutch 40, which is additionally hydraulically actuatable.

An actuating piston 72, which is displaceable in axial direction 6, 8, is provided for hydraulically actuating clutch 40, wherein actuating piston 72 is biased by means of an elastic reset device 74, here a spring device, in its initial position depicted in the FIGURE, in which clutch 40 is open. A first chamber 76, which is delimited outwardly in radial direction 10 and in axial direction 6 by actuating piston 72, in axial direction 8 by second disk carrier 42 and clutch output hub 44, and in radial direction 12 by outer hub section of clutch output hub 44, is designed as a pressure chamber assigned to actuating piston 72. In contrast, a second chamber 78, which is designed as a pressure compensation chamber and assigned to actuating piston 72, is provided on the side of actuating piston 72 opposite first chamber 76 in axial direction 6. Second chamber 78 is delimited in radial direction 10 and in axial direction 6 by a boundary part 80, in this case a boundary part 80 fixed on clutch output hub 44 and/or designed as a shaped sheet metal part, in axial direction 8 by actuating piston 72, and in radial direction 12 by outer hub section 58 of clutch output hub 44. Previously mentioned reset device 74 is arranged within second chamber 78, wherein reset device 74 is supported or supportable in axial direction 6 on boundary part 80 and in axial direction 8 on actuating piston 72.

Thus, a hydraulic fluid may be applied to first chamber 76, designed as a pressure chamber, in order to displace actuating piston 72 in axial direction from the initial depicted position into an actuating position, in which clutch 40 is closed, while a compensation fluid may be applied at a lower pressure to second chamber 78, designed as a pressure compensation chamber, in order to effect a complete or at least partial centrifugal oil compensation.

Hydraulic fluid may be applied to chamber 76, designed as a pressure chamber, via a first rotary feedthrough 82 between stationary component 26 and clutch input hub 20 and via a second rotary feedthrough 84 between clutch input hub 20 and clutch output hub 44. Thus, a hydraulic conduit 86, which is designed within stationary housing 28 and stationary component 26, runs substantially inward in radial direction 12 into first rotary feedthrough 82, which is designed in radial direction 10, 12 between inner side 36 of stationary component 26 and outer side 34 of clutch input hub 20. A first rotary feedthrough sleeve 88 facing inward in radial direction 12 toward rotary feedthrough 82 is thereby arranged rotatably fixed on stationary component 26 or its inner side 36. First rotary feedthrough 82 is thereby thus delimited outward in radial direction 10 substantially by first rotary feedthrough sleeve 88, inwardly in radial direction 12 by outer side 34 of clutch input hub 20, in axial direction 8 by a rotary feedthrough seal 90, and in axial direction 6 by a rotary feedthrough seal 91.

A connection line 92 for achieving a flow connection between first rotary feedthrough 82 and second rotary feedthrough 84 is designed in clutch input hub 20. Said connection line 92 has a longitudinal section 94 extending exclusively in radial direction 4, 6. Longitudinal section 94 is arranged offset inwardly in radial direction 12 with respect to both first rotary feedthrough 82 and also second rotary feedthrough 84, wherein longitudinal section 94 extends within clutch input hub 20 in such a way that said longitudinal section extends parallel to axis of rotation 18, however, is not arranged coaxial with the same. Instead, longitudinal section 94 is arranged offset outwardly in radial direction 10 with respect to axis of rotation 18. Starting from first rotary feedthrough 82, a first radial section 96 of connection line 92 extends inward in radial direction 12 in order that its end facing inward in radial direction 12 opens into the end region of longitudinal section 94 arranged in axial direction 6, and thus establishes a flow connection between first radial section 96 and longitudinal section 94. Furthermore, connection line 92 has a second radial section 98, which, starting from second rotary feedthrough 84, extends inward in radial direction 12 in order that its end facing inward in radial direction 12 is in flow connection with the end section, arranged in axial direction 8, of longitudinal section 94 of connection line 92.

Second rotary feedthrough 84 is arranged and designed between outer side 34 of clutch input hub 20 and an inner side 100 of clutch output hub 44, in this case, inner side 100 of outer hub section 58 of clutch output hub 44. Second rotary feedthrough 84 is also arranged within previously described annular space 62 between outer hub section 58 and inner hub section 56 or is nested in radial direction 10, 12 with said hub sections 56, 58. Similarly to stationary component 26, a second rotary feedthrough sleeve 102 facing second rotary feedthrough 84 is also arranged or fixed rotatably fixed on inner side 100 of outer hub section 58 of clutch output hub 44. First rotary feedthrough sleeve 88 and second rotary feedthrough sleeve 102 are both structurally identical and also designed as identical parts. Second rotary feedthrough 84 is thus delimited inward in radial direction 12 substantially by outer side 34 of clutch input hub 20, outward in radial direction 10 substantially by inner side 100 of outer hub section 58 of clutch output hub 44 or second rotary feedthrough sleeve 102, in axial direction 8 by rotary feedthrough seal 104, and in axial direction 6 by rotary feedthrough seal 106, wherein at least one additional hydraulic conduit 108 is designed within outer hub section 58, said hydraulic conduit starting from second rotary feedthrough 84, extending outward in radial direction 10 into first chamber 76 or opening into the same.

First rotary feedthrough 82 is arranged in a region 110, stated more precisely, in an axial region of clutch input hub 20 with a first outer diameter $d_1$, while second rotary feedthrough 84 is arranged in a region 112, stated more precisely, in an axial region with a second outer diameter $d_2$ of clutch input hub 20, wherein first outer diameter $d_1$ substantially corresponds to second outer diameter $d_2$. In the embodiment shown, first and second outer diameters $d_1$, $d_2$ are identical, however, potential deviations are not to be greater than 10%, particularly preferably not greater than 5%. Also, rotary feedthrough seals 104, 106, which are assigned to second rotary feedthrough 84, and rotary feedthrough seals 90, 91, which are assigned to first rotary feedthrough 82, are not only structurally identical, but are also designed as identical parts. In addition, first rotary feedthrough 82 is arranged in axial direction 6, 8 between two radial bearings 30, 32, while second rotary feedthrough 84 is arranged nested in radial direction 10, 12 with radial bearing 64.

A compensation fluid may be applied to second chamber 78, designed as a pressure compensation chamber, via a third rotary feedthrough 114 between inner side 36 of stationary component 26 and outer side 34 of clutch input hub 20 and via a fourth rotary feedthrough 116 between outer side 34 of clutch input hub 20 and inner side 100 of outer hub section 58 of clutch output hub 44, wherein third and fourth rotary feedthroughs 114, 116 are also designed on the side of clutch input hub 20 facing outward. With regard to third rotary feedthrough 114, it should additionally be mentioned that this is delimited in axial direction 6 by a rotary feedthrough seal 118 and in axial direction 8 by rotary feedthrough seal 91 of first rotary feedthrough 82, so that rotary feedthrough seal 91 is designed here as a common rotary feedthrough seal 91. This correspondingly applies for fourth rotary feedthrough 116, which is delimited in axial direction 6 by a rotary feedthrough seal 120, while the same is additionally delimited in opposite axial direction 8 by rotary feedthrough seal 106 of second rotary feedthrough 84. Consequently, rotary feedthrough seal 106 also forms a common rotary feedthrough seal in this case. Previously mentioned first rotary feedthrough sleeve 88 is also assigned to third rotary feedthrough 114, while previously mentioned second rotary feedthrough sleeve 102 is assigned to fourth rotary feedthrough 116.

In general, the comments regarding first and second rotary feedthroughs 82, 84 apply analogously to third and fourth rotary feedthroughs 114, 116. Thus, in particular, a hydraulic conduit 122 in stationary component 26, a connection line 124 in clutch input hub for flow connection of third and fourth rotary feedthroughs 114, 116 are assigned to third rotary feedthrough 114, and another hydraulic conduit 126 in outer hub section 58 of clutch output hub 44 is assigned to fourth rotary feedthrough 116 in order to bring fourth rotary feedthrough 116 into flow connection with second chamber 78, designed as a pressure compensation chamber. The structure of connection line 124 within clutch input hub 20 thereby substantially corresponds to the structure of connection line 92, which was already previously described. In addition, it should be mentioned that third rotary feedthrough 114 is arranged in axial direction 6, 8 between two radial bearings 30, 32, while fourth rotary feedthrough 116 is arranged nested in radial direction 10, 12 with radial bearing 64. Two rotary feedthrough seals 118, 120 and previously described rotary feedthrough seals 90, 91, 104, 106 are also structurally identical and designed as identical parts.

LIST OF REFERENCE NUMERALS

2 Clutch device
4 Drivetrain
6 Axial direction
8 Axial direction
10 Radial direction
12 Radial direction
14 Circumferential direction
16 Circumferential direction
18 Axis of rotation
20 Clutch input hub
22 Torsional vibration damper
24 Drive unit
26 Stationary component
28 Stationary housing
30 Radial bearing
32 Radial bearing
34 Outer side
36 Inner side
38 First disk carrier
40 Clutch
42 Second disk carrier
44 Clutch output hub
46 Electric machine
48 Input side
50 Transmission
52 Rotor
54 Stator
56 Inner hub section
58 Outer hub section
60 Connection line
62 Annular space
64 Radial bearing
66 Radial bearing
68 Inner side
70 Outer side
72 Actuating piston
74 Reset device
76 First chamber
78 Second chamber
80 Boundary part
82 First rotary feedthrough
84 Second rotary feedthrough
86 Hydraulic conduit
88 First rotary feedthrough sleeve
90 Rotary feedthrough seal
91 Rotary feedthrough seal
92 Connection line
94 Longitudinal section
96 First radial section
98 Second radial section
100 Inner side
102 Second rotary feedthrough sleeve
104 Rotary feedthrough seal
106 Rotary feedthrough seal
108 Hydraulic conduit
110 Region
112 Region
114 Third rotary feedthrough
116 Fourth rotary feedthrough
118 Rotary feedthrough seal
120 Rotary feedthrough seal
122 Hydraulic conduit
124 Connection line
126 Hydraulic conduit
$d_1$ First outer diameter
$d_2$ Second outer diameter

The invention claimed is:

1. A clutch device (2) comprising a clutch input hub (20) which is connectable to a drive unit (24), a clutch output hub (44) which is connectable to an electric machine (46) and/or to a transmission (50), a clutch (40) via which the clutch input hub (20) can be selectively brought into rotary driving connection with the clutch output hub (44), and an actuating piston (72) for hydraulically actuating the clutch (40), a chamber (76) to which fluid may be applied being assigned to said actuating piston, wherein fluid can be applied to the chamber (76) via a first rotary feedthrough (82) between a stationary component (26) and the clutch input hub (20) and via a second rotary feedthrough (84) between the clutch input hub (20) and the clutch output hub (44), wherein the first rotary feedthrough (82) and the second rotary feedthrough (84) are designed on the side of the clutch input hub (20) facing outward in radial direction (10).

2. The clutch device (2) according to claim 1, wherein the first rotary feedthrough (82) is arranged in a region (110) of the clutch input hub (20) with a first outer diameter ($d_1$) and the second rotary feedthrough (84) is arranged in a region (112) of the clutch input hub (20) with a second outer diameter ($d_2$), wherein the first outer diameter ($d_1$) corresponds to the second outer diameter ($d_2$).

3. The clutch device (2) according to claim 1, wherein a radial bearing (64) is provided to support the clutch input hub (20) in radial direction (10, 12) on the clutch output hub (44), wherein the radial bearing (64) is arranged nested in radial direction (10, 12) with the first rotary feedthrough (82) or with the second rotary feedthrough (84).

4. The clutch device (2) according to claim 1, wherein the second rotary feedthrough (84) is designed on a side of the clutch output hub (44) facing inward in radial direction (12), wherein the clutch input hub (20) extends in axial direction (6, 8) into the clutch output hub (44) and the second rotary feedthrough (84) and/or the radial bearing (64) is arranged within the annular space (62).

5. The clutch device (2) according to claim 1, wherein at least one connection line (92) is designed in the clutch input hub (20) to achieve a flow connection between the first and second rotary feedthroughs (82, 84), wherein the connection line (92) has a longitudinal section (94) extending in axial direction (6, 8), said longitudinal section is in flow connection with the first rotary feedthrough (82) via a first radial direction (96) of the connection line (92) extending in radial direction (10, 12) and with the second rotary feedthrough (84) via a second radial section (98) of the connection line (92) extending in radial direction (10, 12), and the longitudinal section (94) is arranged offset inward in radial direction (12) with respect to both the first rotary feedthrough (82) as well as with respect to the second rotary feedthrough (84).

6. The clutch device (2) according to claim 1, wherein the first rotary feedthrough (82) is delimited by at least one first rotary feedthrough seal (90, 91) and the second rotary feedthrough (84) is delimited in axial direction (6, 8) by at least one second rotary feedthrough seal (104, 106), wherein the first and second rotary feedthrough seals (90, 91; 104, 106) are structurally identical or are designed as identical parts.

7. The clutch device (2) according to claim 1, wherein a first rotary feedthrough sleeve (88) facing the first rotary feedthrough (82) is arranged rotatably fixed on the stationary component (26) or on the clutch input hub (20), and a second rotary feedthrough sleeve (102) facing the second rotary feedthrough (84) is arranged rotatably fixed on the clutch output hub (44) or on the clutch input hub (20), wherein the first and second rotary feedthrough sleeves (88, 102) are structurally identical or are designed as identical parts.

8. The clutch device (2) according to claim 1, wherein the clutch input hub (20) is supported in radial direction (10, 12) via at least one radial bearing (30, 32) on the stationary component (26), wherein the first rotary feedthrough (82) is arranged in axial direction (6, 8) between two radial bearings (30, 32).

9. The clutch device (2) according to claim 1, wherein the chamber (76) is a pressure chamber to which hydraulic fluid can be applied, or a pressure compensation chamber, to which a compensation fluid can be applied.

10. A drivetrain (4) for a hybrid vehicle having a clutch device (2) according to claim 1, wherein the clutch input hub (20) is in rotary driving connection with a drive unit (24), preferably with an internal combustion engine, and the clutch output hub (44) is in rotary driving connection with a transmission (50) and with an electric machine (46).

11. The clutch device (2) according to claim 2, wherein a radial bearing (64) is provided to support the clutch input hub (20) in radial direction (10, 12) on the clutch output hub (44), wherein the radial bearing (64) is arranged nested in radial direction (10, 12) with the first rotary feedthrough (82) or with the second rotary feedthrough (84).

12. The clutch device (2) according to claim 2, wherein the second rotary feedthrough (84) is designed on a side of the clutch output hub (44) facing inward in radial direction (12), wherein the clutch input hub (20) extends in axial direction (6, 8) into the clutch output hub (44), and the second rotary feedthrough (84) and/or the radial bearing (64) is arranged within the annular space (62).

13. The clutch device (2) according to claim 3, wherein the second rotary feedthrough (84) is designed on a side of the clutch output hub (44) facing inward in radial direction (12), wherein the clutch input hub (20) extends in axial direction (6, 8) into the clutch output hub (44), and the second rotary feedthrough (84) and/or the radial bearing (64) is arranged within the annular space (62).

14. The clutch device (2) according to claim 2, wherein at least one connection line (92) is designed in the clutch input hub (20) to achieve a flow connection between the first and second rotary feedthroughs (82, 84), wherein the connection line (92) has a longitudinal section (94) extending in axial direction (6, 8), said longitudinal section is in flow connection with the first rotary feedthrough (82) via a first radial direction (96) of the connection line (92) extending in radial direction (10, 12) and with the second rotary feedthrough (84) via a second radial section (98) of the connection line (92) extending in radial direction (10, 12), and the longitudinal section (94) is arranged offset inward in radial direction (12) with respect to both the first rotary feedthrough (82) as well as with respect to the second rotary feedthrough (84).

15. The clutch device (2) according to claim 1, wherein a roller bearing is provided to support the clutch input hub (20) in the radial direction (10, 12) on the clutch output hub (44), wherein the roller bearing is arranged nested in the radial direction (10, 12) with the second rotary feedthrough (84).

16. The clutch device (2) according to claim 1, wherein the second rotary feedthrough (84) is designed on a side of the clutch output hub (44) facing inward in radial direction (12), wherein the clutch input hub (20) extends in axial direction (6, 8) into an annular space (62) in the clutch output hub (44) that is open in an axial direction (6), and the second rotary feedthrough (84) and/or the radial bearing (64) is arranged within the annular space (62).

17. The clutch device (2) according to claim 1, wherein the clutch input hub (20) is supported in radial direction (10, 12) via at least one radial bearing (30, 32) on the stationary component (26) and a support tube into which the clutch input hub (20) extends, wherein the first rotary feedthrough (82) is arranged particularly preferably in an axial direction (6, 8) between two radial bearings (30, 32).

18. The clutch device (2) according to claim 9, wherein an additional second chamber (78), designed as a pressure compensation chamber or a pressure chamber, is assigned to actuating piston (72), fluid being applied to said additional second chamber (78) via a third rotary feedthrough (114) between the stationary component (26) and the clutch input hub (20) and via a fourth rotary feedthrough (116) between the clutch input hub (20) and the clutch output hub (44), said additional second chamber (78) being designed on the side of clutch input hub (20) facing outward in radial direction (10) and/or having a common rotary feedthrough seal (91; 106) with the respectively adjacent first or second rotary feedthrough (82; 84).

* * * * *